No. 689,451. Patented Dec. 24, 1901.
D. H. BARRY.
BICYCLE SUPPORT OR REST.
(Application filed May 16, 1901.)
(No Model.) 2 Sheets—Sheet 1.
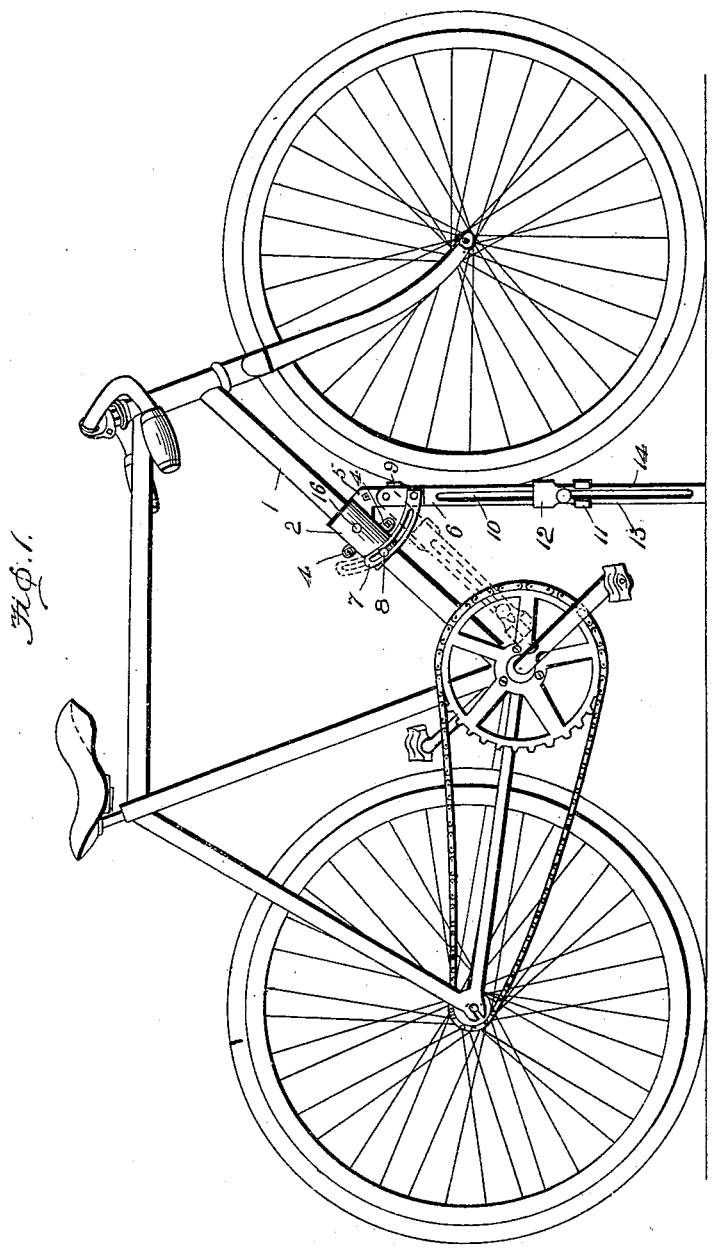
Witnesses
Bernard M. Offutt
M. W. Johnson
Inventor
David H. Barry,
by David P. Moore.
Attorney No. 689,451. Patented Dec. 24, 1901.
D. H. BARRY.
BICYCLE SUPPORT OR REST.
(Application filed May 16, 1901.)
(No Model.) 2 Sheets—Sheet 2.
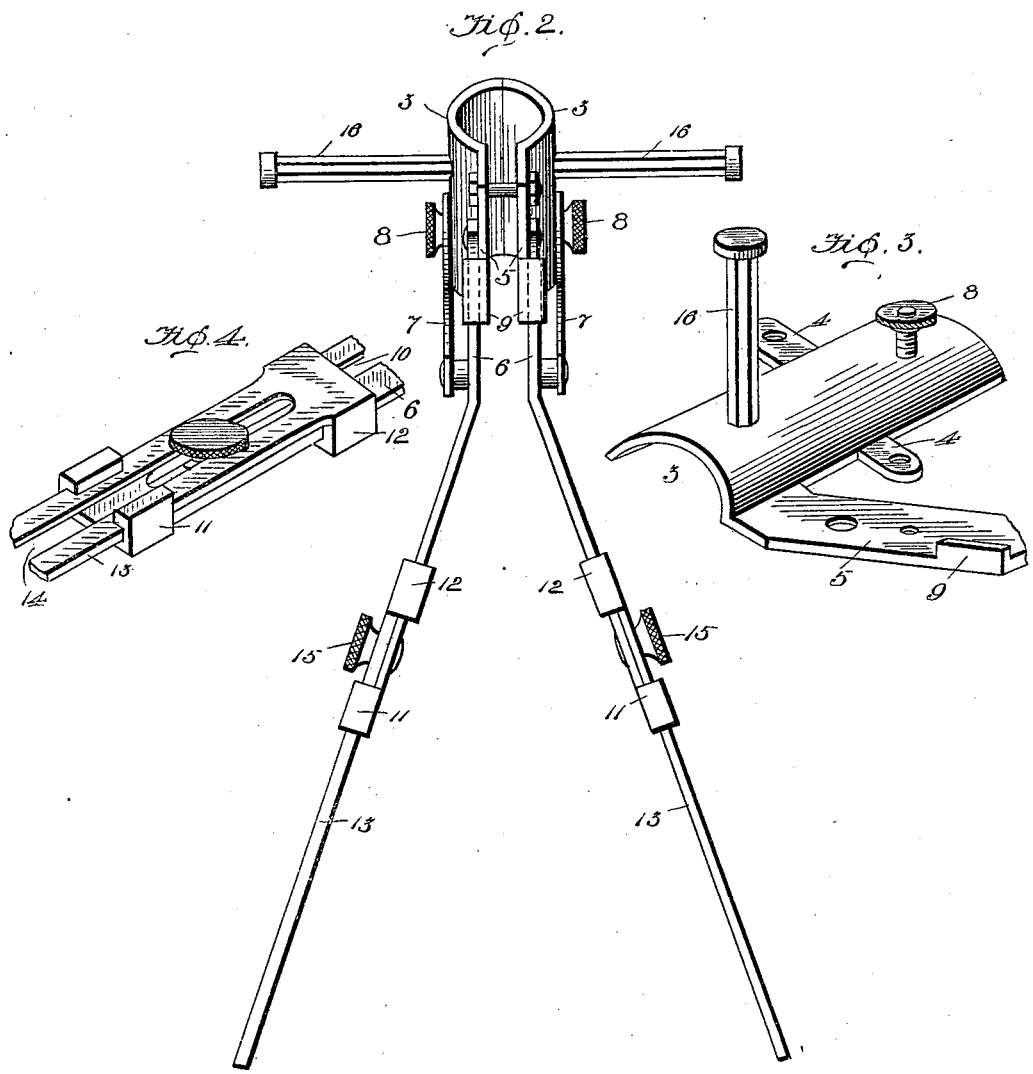

UNITED STATES PATENT OFFICE.

DAVID HENEY BARRY, OF NEWPORT, RHODE ISLAND.

BICYCLE SUPPORT OR REST.

SPECIFICATION forming part of Letters Patent No. 689,451, dated December 24, 1901.

Application filed May 16, 1901. Serial No. 60,447. (No model.)

*To all whom it may concern:*

Be it known that I, DAVID HENEY BARRY, a citizen of the United States, residing at Newport, in the county of Newport and State of Rhode Island, have invented certain new and useful Improvements in Bicycle Supports or Rests, of which the following is a specification.

My invention relates to improvements in bicycle rests or supports; and the main object of my invention is the provision of a support detachably secured to the frame of a bicycle and so connected and constructed as to be swung into and out of use, said support being adjustable to any height of frame.

Another object of my invention is the provision of a support which will support a bicycle in an upright position and which is the embodiment of simplicity, durability, and cheapness, thus producing a very useful and practical support.

To attain the desired objects, the invention consists of a bicycle support or rest embodying novel features of construction and arrangement of parts, substantially as disclosed herein.

In the drawings, Figure 1 is a side elevation of a bicycle with my support in use thereon, the same being in dotted lines as when out of use. Fig. 2 is a front elevation of the support or rest. Fig. 3 is a detail view of the coupling-sleeve. Fig. 4 is a detail view of a portion of one leg of the support.

Referring to the drawings, the numeral 1 designates the lower inclined tube of a bicycle to which my improvement is secured.

My invention consists of the clamp 2, formed by the two clamping-plates 3, and the lugs 4 to receive bolts to secure the plates upon the tubing of the frame. These plates are also provided with the depending arms 5, to each of which is pivoted or swingingly connected the flat rod or plate 6, having the lower ends diverging. Connected to each of these plates are the slotted segmental arms 7, which are adjustably secured to the clamping-plates by means of the thumb-screws or set-screws 8 to hold the plates 6 at the proper adjustment. The arms 5 are provided with the offsets or lips 9 to steady the plates 6. The plates 6 are also provided each with the long slot 10 and the clip or cleat 11 upon its lower end, and adjustably sliding in this cleat and also having a similar cleat or clip 12 is the lower extension rod or plate 13, which is also provided with a slot 14. A clamping-screw 15 is employed to hold these plates or rods at their proper adjustment.

Carried by each clamping-plate and extending in opposite directions are the coaster tubes or arms 16, which enable my support to answer the purpose of a coaster as well as a support or rest for the bicycle, thus providing a very useful and practical attachment for a bicycle.

From this description, taken in connection with the drawings, the many uses and advantages of my invention will be readily understood and appreciated, and from close observance of the drawings the invention will be clearly understood.

What I claim as new, and desire to secure by Letters Patent, is—

1. A bicycle support or rest, comprising two clamping members, arms extending in opposite directions carried by each of said members, a pair of diverging arms or plates pivotally connected to said members, a curved segmental arm connected to each plate, and adjustably secured to the member, and an adjustable leg or plate connected to each of said diverging arms or plates to which the segmental arm is connected.

2. A bicycle support or rest, comprising two clamping members, a pair of diverging arms or plates pivotally connected to one of each of said members, a curved segmental arm connected to each of said plates, and adjustably secured to the member, and an adjustable leg or plate connected to each of said diverging arms or plates to which the segmental arm is connected.

3. A support or rest for bicycles, adapted to be secured to the lower brace-tubing thereof, comprising means to removably clamp the same to the frame, oppositely-extending arms carried by said means, depending arms formed integral with said means and provided with lips near their lower ends, adjustable supporting plates or legs pivoted to said arms and limited in their movement by said lips, and a segmental plate carried by each plate and adjustably secured to the clamping means to hold the support in the desired position.

In testimony whereof I affix my signature in presence of two witnesses.

DAVID HENEY BARRY.

Witnesses:
RICHARD FITZGERALD,
THOS. EMERSON.